United States Patent
Meganathan et al.

(10) Patent No.: US 9,891,789 B2
(45) Date of Patent: Feb. 13, 2018

(54) SYSTEM AND METHOD OF INTERACTIVE IMAGE AND VIDEO BASED CONTEXTUAL ALARM VIEWING

(71) Applicant: Honeywell International Inc., Morristown, NJ (US)

(72) Inventors: Deepak Sundar Meganathan, Bangalore (IN); Manu Thomas, Chennai (IN); Sivasanthanam Dhayalan, Thiruvannamalai (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 326 days.

(21) Appl. No.: 14/571,589

(22) Filed: Dec. 16, 2014

(65) Prior Publication Data

US 2016/0170577 A1    Jun. 16, 2016

(51) Int. Cl.
| | |
|---|---|
| H04N 7/18 | (2006.01) |
| G08B 13/00 | (2006.01) |
| G06F 3/0482 | (2013.01) |
| H04N 5/247 | (2006.01) |
| G06F 3/0481 | (2013.01) |
| G06F 3/0484 | (2013.01) |
| G08B 13/196 | (2006.01) |

(52) U.S. Cl.
CPC ........ *G06F 3/0482* (2013.01); *G06F 3/04817* (2013.01); *G06F 3/04842* (2013.01); *G08B 13/19645* (2013.01); *G08B 13/19665* (2013.01); *G08B 13/19682* (2013.01); *G08B 13/19691* (2013.01); *H04N 5/247* (2013.01); *H04N 7/181* (2013.01)

(58) Field of Classification Search
None
See application file for complete search history.

(56) References Cited

U.S. PATENT DOCUMENTS

| | | | | |
|---|---|---|---|---|
| 8,650,290 B2* | 2/2014 | Dare | ..................... | G06F 3/0481 455/3.01 |
| 8,754,924 B1* | 6/2014 | Shane | ..................... | H04N 7/15 348/14.05 |

(Continued)

OTHER PUBLICATIONS

Extended European search report from corresponding EP patent application 15198542.1, dated May 11, 2016.

*Primary Examiner* — Mohammad J Rahman
(74) *Attorney, Agent, or Firm* — Husch Blackwell LLP

(57) ABSTRACT

A video surveillance system having a plurality of video-type cameras includes a graphical user interface which is not list driven but provides a background image of a portion of the region being monitored, and, event or incident identifiers associated with the provided background image. The event or incident identifiers are presented semi-transparently and overlay the background image. Each of the incident identifiers includes a selectable icon. Selecting the icon switches to a different background image and presents a different foreground group of incidents or events associated with the different background image. The various events or incidents can be explored in the context of the background image. In addition with selecting the icons user can also select the event or incident identifier to see the corresponding background image. Once the background image is updated, user can start play the video directly in the same view.

8 Claims, 4 Drawing Sheets

(56) References Cited

U.S. PATENT DOCUMENTS

| | | | |
|---|---|---|---|
| 9,116,786 B2* | 8/2015 | Ricci | G06F 17/00 |
| 9,472,072 B2* | 10/2016 | M | G08B 13/19669 |
| 2002/0067258 A1* | 6/2002 | Lyons | G06K 9/00228 |
| | | | 340/541 |
| 2013/0091432 A1 | 4/2013 | Shet et al. | |
| 2013/0094034 A1 | 4/2013 | Heckler et al. | |
| 2013/0293718 A1* | 11/2013 | M | G08B 13/19669 |
| | | | 348/152 |
| 2014/0085334 A1 | 3/2014 | Payne | |
| 2014/0232873 A1* | 8/2014 | Meganathan | G06F 3/04817 |
| | | | 348/152 |
| 2014/0240455 A1* | 8/2014 | Subbian | H04N 7/183 |
| | | | 348/39 |
| 2014/0320668 A1* | 10/2014 | Kalevo | H04N 5/23212 |
| | | | 348/169 |
| 2014/0368601 A1* | 12/2014 | deCharms | H04W 4/021 |
| | | | 348/14.02 |

* cited by examiner

SYSTEM AND METHOD OF INTERACTIVE IMAGE AND VIDEO BASED CONTEXTUAL ALARM VIEWING

FIELD

The application pertains to systems and methods of presenting primarily non-tabular multilevel images of alarms or events via a user friendly graphical user interface. More particularly, the application pertains to such systems and methods that provide a background contextual image that is overlaid, in part, by one or more semitransparent alarm or event indicating elements.

BACKGROUND

Video surveillance systems are used in almost all business sectors for security and surveillance purposes. Primary usage of these systems includes live monitoring, reviewing playback videos, and event, alarm, bookmark and incident reviews. A recurring problem with these systems is that they are primarily list driven. Alarm and event lists are presented in a more or less static configuration and need further improvements.

Alarm lists make for difficult reading in that they often show a basic description about alarm details, alarm device, alarm time, and alarm location. Most of the time, alarms will be listed in a tabular list format.

Further, most of the time, alarms will be linked with some video data, like "Motion detection on Camera 39". For such an alarm, a user has to obtain video from camera 39. Many known types of systems, such as life safety systems, building automation and management systems, home automation systems, and residential security systems, for example, are integrated with a regional video system to provide visual alarm verification.

Existing alarm and event views give more or less static information. There may be linkages to other interfaces for retrieving relevant video, but information needs to be extracted from different interfaces or different subsystems. This problem is more applicable for video based mobile applications (CCTV) since screen size is limited. Nowadays, most residential security systems, connected home systems, and residential home automation systems are controlled and monitored remotely though mobile devices, such as smart phones and tablets.

In summary, in known systems, there is no contextual view or information for events to be reviewed (even before starting video retrieval). For example in a scenario where a CCTV operator is looking for a person in a red shirt who forcibly opened an access door, to find an exact alarm and video clip, the CCTV operator needs to play an entire video clip.

DETAILED DESCRIPTION

Figure 1:
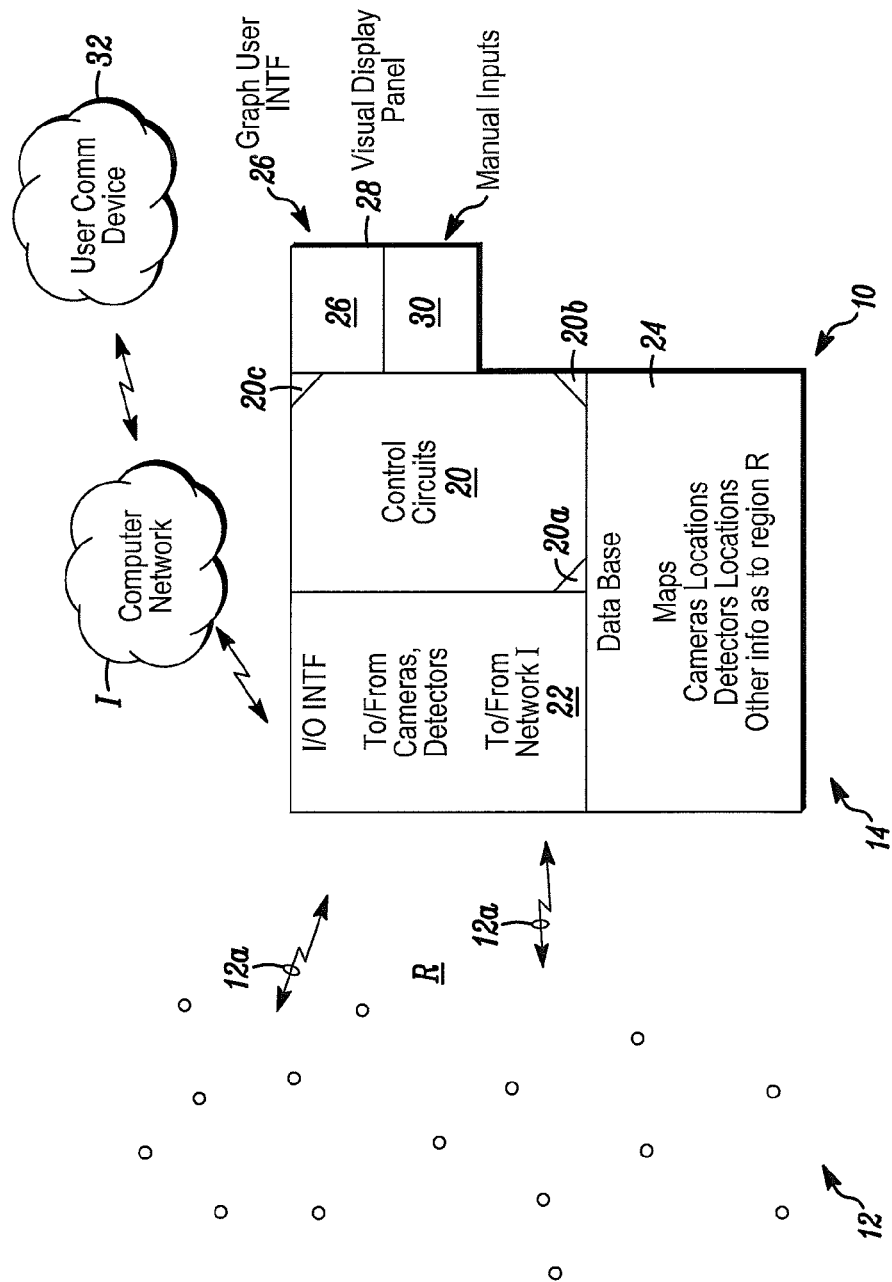
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or the claims to the specific embodiments illustrated. In one aspect, contextual alarm views are presented after users review a list of events and alarms from a system and select a type of event. A user interface presents a background screen that shows context information for a selected event or alarm.

Context information can include a video snapshot image at an alarm time, a video clip at the alarm time, or alarm location information, for example, by presenting a 2D floor map or a 3D model or BIM. On an as needed basis, a user or an operator can start playing video directly from an alarm view.

Once alarm video starts playing the alarm video, other alarm lists can be suppressed. Each event type can be displayed with text and a semitransparent icon. Selected events can be highlighted by selecting or highlighting a respective icon. An event list can be navigated up and down by touch or by using a mouse (workstation or mobile device). Camera views can be selected based on a physical location of an alarmed device or detector that is in an alarm state. In the event of an alarm from a sub system, like an invalid access card entry, the alarm can retrieve a logical video feed.

FIG. 1 illustrates a system 10 in accordance herewith. In one embodiment, the system 10 implements a video surveillance system. A plurality of video cameras 12 is installed to monitor various aspects of a region R.

Members of the plurality of video cameras 12 communicate via a wired or wireless medium, indicated at 12a, with a monitoring or security station 14. The monitoring or security station 14 includes control circuits 20 that can be implemented, at least in part, with one or more programmable processors 20a and software 20b executable by the one or more programmable processors 20a.

An input/output interface 22 coupled to the control circuits 20 facilitates communications with the members of the plurality of video cameras 12. A data base 24 provides storage for various types of information, including maps of the region R and information as to characteristics of and location of the members of the plurality 12 of video cameras that, in addition to the video cameras, can also include various types of ambient condition detectors.

The monitoring or security station 14 also includes a graphical user interface 26 coupled to the control circuits 20. The graphical user interface 26, which can be driven by the software 20c and the the one or more programmable processors 20a, can include a visual display panel 28. In addition, it can include manually operable communications elements 30. The manually operable communications elements 30 can include mouse-type devices, keyboards, and touch screens.

The monitoring or security station 14, via the input/output interface 22, can also communicate wirelessly, via a computer network, such as the internet I, with a user's displaced communication device 32. The below described contextual screens can be readily presented on the user's displaced communications device 32 such as smart phones, tablets, or the like, all without limitation.

Those of skill will understand that detailed characteristics of elements of the monitoring or security station 14 do not constitute limitations hereof except as described herein. Variations of components of the monitoring or security station 14 come within the spirit and scope hereof. The graphical user interface 26, as discussed below, can present to the user multi-level contextual displays driven by outputs from members of the plurality of video cameras 12 and choices made by the user.

Figure 2:
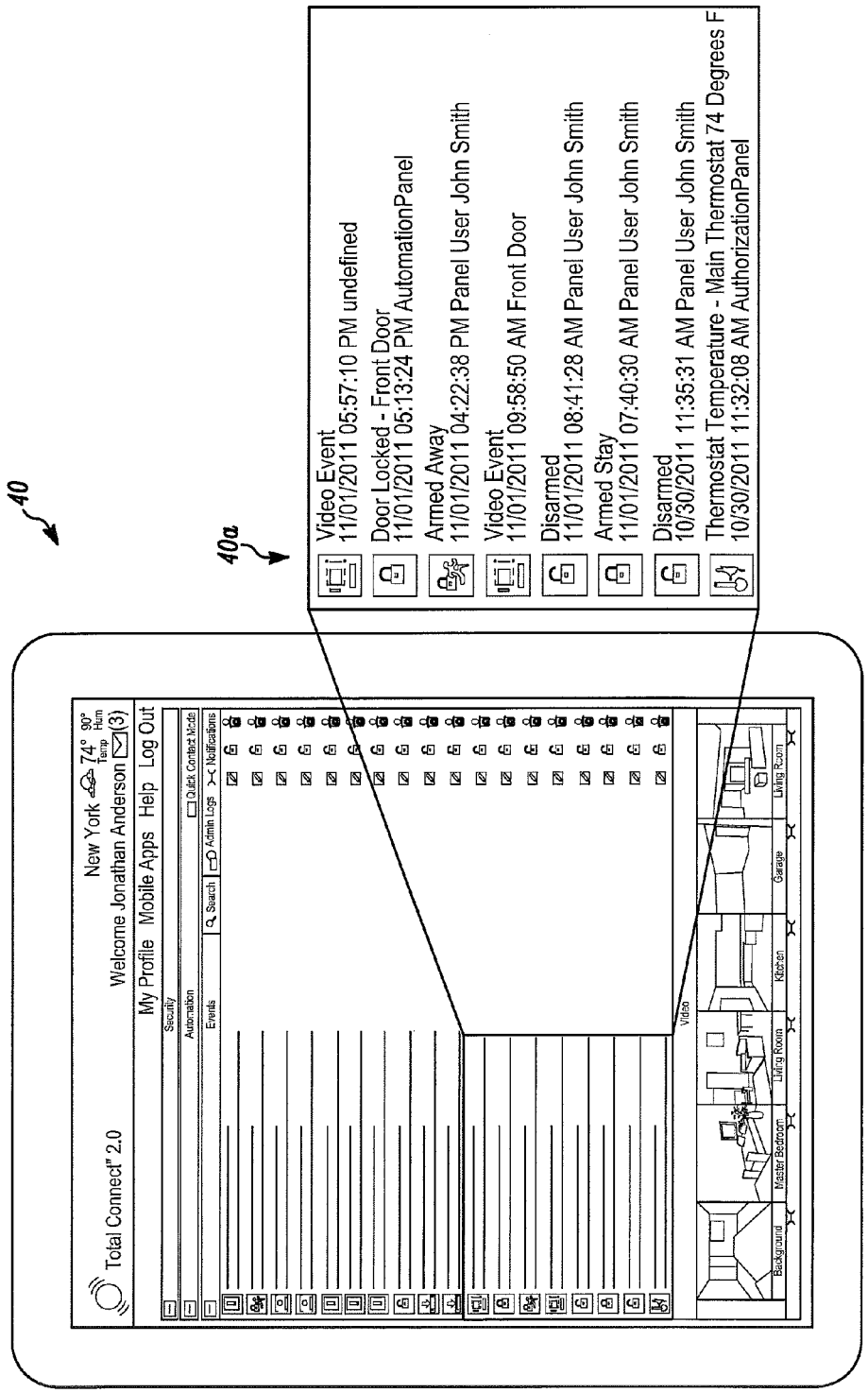
FIG. 2 illustrates an exemplary event or incident list.

FIG. 2 illustrates an exemplary display 40 with an enlarged section 40a that might be present on the visual display panel 28 for purposes of monitoring the region R. The display 40 illustrates a series of events, incidents, or conditions in the region R that have been noted by the monitoring or security station 14. The user can initiate a process by clicking on or selecting a member of a list on the display 40 using one of the manually operable communication elements 30.

Figure 3:
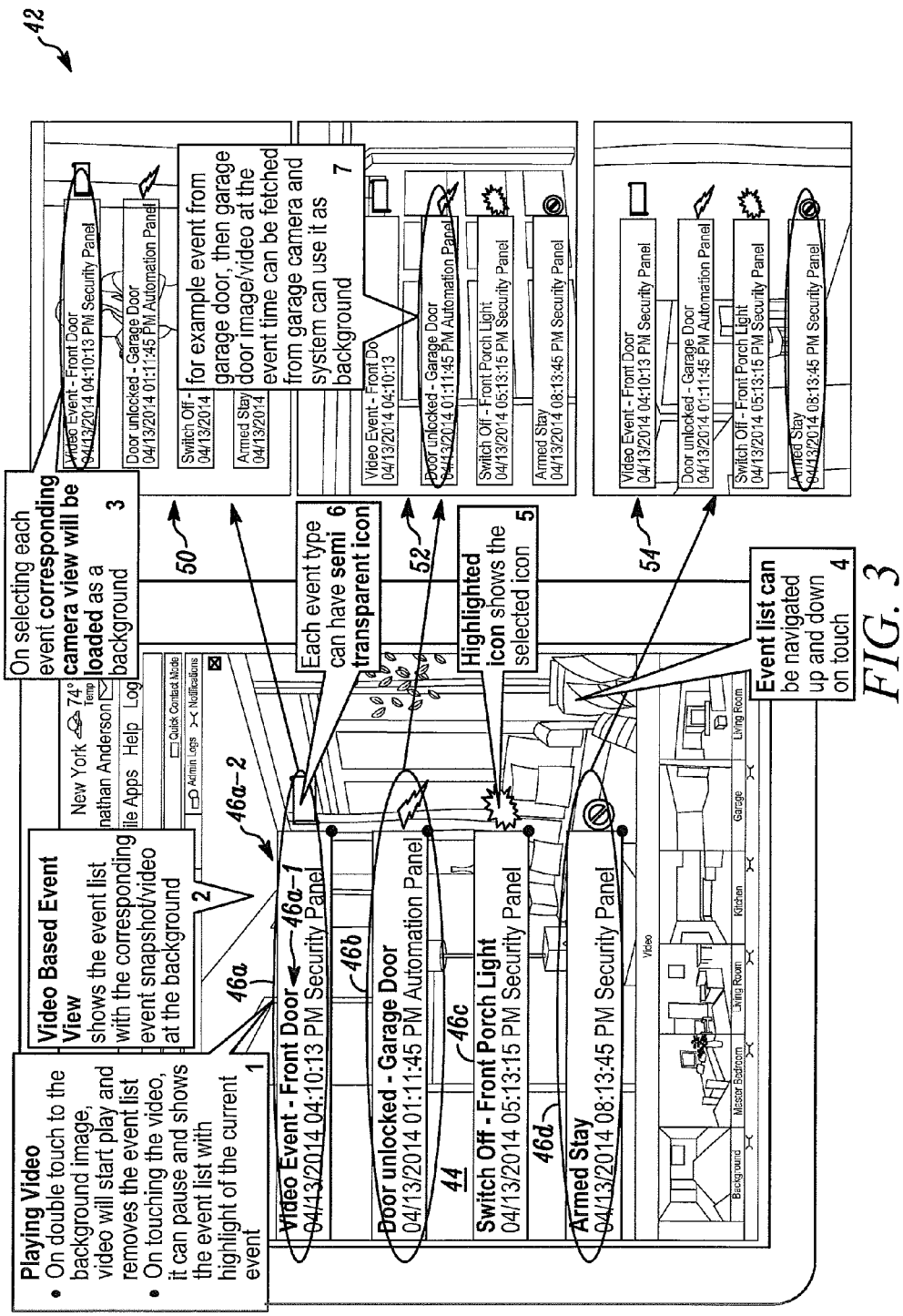
FIG. 3 illustrates a multi layered context displaying interface screen.

FIG. 3 illustrates an exemplary contextual display 42 responsive to the user's selection on the list of FIG. 2. The user can be local to the monitoring or security station 14 and the visual display panel 28 or can access the display 40 via a computer network and a mobile device, such as the user's displaced communications device 32.

Advantageously, the contextual display 42 associated with monitoring a residence is not a mere list that might identify a camera, status, or location. Instead, the user is presented with a multi-level background contextual display 44 that is associated with a current event. The multi-level background display 44 is overlaid by one or more semi-transparent foreground event identifiers, which include text and associated icons 46a, 46b, 46c, 46d (from an event list) that represent events, conditions, or alarms in the region R.

Each of the semi-transparent foreground event identifiers can include a textual part 46a-1 and an activatable icon 46a-2. The activatable icon 46i can be independently selected for further investigation by the user or a system operator. In FIG. 3, where the user selects the activatable icon 46a-2 associated with a video event 46a-1, a background screen switches from a background 44 to a background 50 and a corresponding set of the semi-transparent foreground event identifiers. Selecting other icons in FIG. 3 directs a the user to background screens 52 or 54, each of which is presented with overlaid ones of the semi-transparent foreground event identifiers of the type discussed above.

Figure 4:
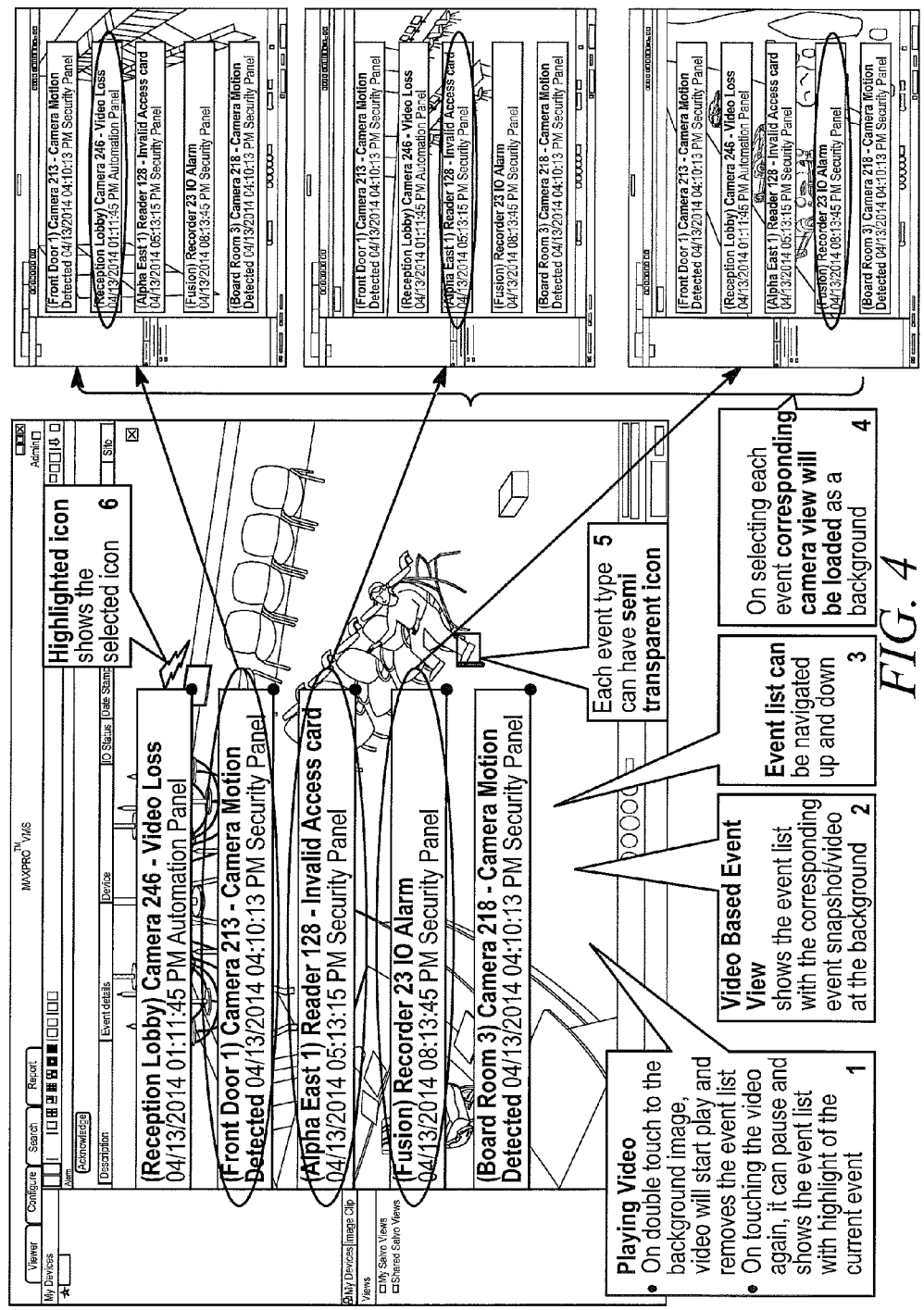
FIG. 4 illustrates a contextual presentation of event or incident information.

FIG. 4 illustrates a set of background contextual images and associated ones of the semi-transparent foreground event identifiers that might be generated for a video surveillance system installed in a commercial establishment, such as a casino. In each instance, one of the background contextual images is overlaid with some of the semitransparent foreground event identifiers of the type discussed above.

In summary, embodiments hereof enhance the user's experiences by reducing time needed to search video data for intended clips or the like. Instant visual context presenting images are provided to the user while investigating a list of alarms or events. Incident management should be improved due to enhanced and faster understanding of an incident.

Those of skill will understand that it is not necessary that any member of the plurality of video cameras 12 include video-type cameras. Some members of the plurality of video cameras 12 can be non-video ambient condition detectors. In this instance, a pre-stored background image can be displayed with overlaying semitransparent event or incident identifiers.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. An apparatus comprising:
   a plurality of monitoring devices, wherein at least some members of the plurality of monitoring devices include video-type cameras;
   control circuits coupled to the plurality of monitoring devices;
   at least one visual output device coupled to the control circuits;
   a manually operable selection element coupled to the control circuits; and
   a data base of events, alarms, and the plurality of monitoring devices,
   wherein the events, the alarms, and the plurality of monitoring devices from the data base are visually presented as a list on the at least one visual output device,
   wherein the control circuits, responsive to a first selection of a first one of the events, the alarms, or the plurality of monitoring devices on the list, present a first background contextual display associated with the first one of the events, the alarms, or the plurality of monitoring devices and one or more semi-transparent foreground images associated with the events, the alarms, or the plurality of monitoring devices,
   wherein the one or more semi-transparent foreground images are presented on the at least one visual output device overlaying the first background contextual display and wholly confined within an area of the at least one visual output device currently displaying the first background contextual display,
   wherein the one or more semi-transparent foreground images include text and selectable icons,
   wherein the control circuits, responsive to a second selection of one of the selectable icons, replace the first background contextual display with a second background contextual display associated with the one of the selectable icons and a corresponding second one of the events, the alarms, or the plurality of monitoring devices,
   wherein the one or more semi-transparent foreground images are presented on the at least one visual output device overlaying the second background contextual display and wholly confined within the area of the at least one visual output device currently displaying the second background contextual display, and
   wherein the control circuits, responsive to a user-input, initiate playback of a video clip associated with the first background contextual display or the second background contextual display and automatically remove the one or more semi-transparent foreground images from the at least one visual output device during the playback of the video clip.

2. The apparatus as in claim 1 wherein additional information, relative to the list of the events, the alarms, or the plurality of monitoring devices, is presented on the at least one visual output device.

3. The apparatus as in claim 2 wherein the first and second background contextual displays include context information.

4. The apparatus as in claim 3 wherein the first and second background contextual displays are selected from a class that includes video clips and singular screen views.

5. The apparatus as in claim 3 wherein the first and second background contextual displays are selected from a class that includes snapshot images of a portion of a monitored region and video data from the portion of the monitored region.

6. The apparatus as in claim 1 wherein the members of the plurality of monitoring devices are selected from a class that includes the video-type cameras and ambient condition detectors.

7. A method comprising:
  visually presenting, on a visual output device, a list of a plurality of events from a monitored region;
  receiving a first selection of a first one of the plurality of events from the list;
  presenting, on the visual output device, a first background contextual image of a first portion of the monitored region associated with the first one of the plurality of events;
  presenting, on the visual output device, the list of the plurality of events as semitransparent foreground event identifiers overlaying the first background contextual image and wholly confined within an area of the visual output device currently displaying the first background contextual image, wherein the semitransparent foreground event identifiers include selectable icons;
  receiving a second selection of one of the selectable icons;
  replacing, on the visual output device, the first background contextual image with a second background contextual image of a second portion of the monitored region associated with the one of the selectable icons and a corresponding second one of the plurality of events;
  presenting, on the visual output device, the semitransparent foreground event identifiers overlaying the second background contextual image and wholly confined within the area of the visual output device currently displaying the second background contextual image;
  responsive to a user-input, initiating playback of a video clip associated with the first background contextual image or the second background contextual image; and
  automatically removing the semitransparent foreground event identifiers from the visual output device during the playback of the video clip.

8. The method as in claim 7 further comprising scrolling through the semitransparent foreground event identifiers on top of the first contextual background image to locate the one of the selectable icons.

* * * * *